United States Patent
Chun et al.

(10) Patent No.: US 8,879,414 B2
(45) Date of Patent: Nov. 4, 2014

(54) METHOD AND APPARATUS FOR TRANSMITTING DATA IN A WIRELESS COMMUNICATION SYSTEM

(75) Inventors: Jin Young Chun, Anyang-si (KR); Ji Won Kang, Anyang-si (KR); Bin Chul Ihm, Anyang-si (KR); Sung Ho Park, Anyang-si (KR); Ki Tae Kim, Anyang-si (KR); Su Nam Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/702,276

(22) PCT Filed: Jun. 15, 2011

(86) PCT No.: PCT/KR2011/004381
§ 371 (c)(1),
(2), (4) Date: Dec. 5, 2012

(87) PCT Pub. No.: WO2011/159099
PCT Pub. Date: Dec. 22, 2011

(65) Prior Publication Data
US 2013/0088995 A1   Apr. 11, 2013

Related U.S. Application Data

(60) Provisional application No. 61/354,708, filed on Jun. 15, 2010.

(51) Int. Cl.
*H04W 72/04* (2009.01)
*H04B 7/06* (2006.01)

(52) U.S. Cl.
CPC ............ *H04W 72/04* (2013.01); *H04B 7/0626* (2013.01)

USPC .......................................... 370/252; 370/329

(58) Field of Classification Search
CPC ...................................................... H04W 72/04
USPC ............ 455/522, 10; 370/338, 350, 332, 216, 370/329, 345, 315, 252; 375/267
See application file for complete search history.

(56) References Cited

U.S. PATENT DOCUMENTS

| | | | |
|---|---|---|---|
| 7,983,674 B2* | 7/2011 | Julian et al. | 455/436 |
| 8,463,210 B2* | 6/2013 | Lee et al. | 455/129 |
| 8,660,812 B2* | 2/2014 | Gregg et al. | 702/106 |
| 2003/0060224 A1* | 3/2003 | Nelson et al. | 455/522 |

(Continued)

FOREIGN PATENT DOCUMENTS

| | | | | |
|---|---|---|---|---|
| KR | 10-20050020549 | | 3/2005 | |
| KR | 2008073190 | * | 8/2008 | ............... H04L 7/00 |
| KR | 10-2010-0051529 | | 5/2010 | |

*Primary Examiner* — Khaled Kassim
*Assistant Examiner* — Parth Patel
(74) *Attorney, Agent, or Firm* — Mckenna Long & Aldridge LLP (57) ABSTRACT

The present invention relates to a method and apparatus for transmitting data in a wireless communication system. The method for transmitting data involves allocating a first node set containing a plurality of nodes for the transmission of downlink signals and a second node set containing a plurality of nodes for the reception of uplink signals, and communicating with a terminal through the first node set and the second node set. In the event the uplink transmission and downlink transmission are performed by base stations or nodes that are different from each other, the operation of the base stations and of a terminal can be efficiently controlled.

6 Claims, 7 Drawing Sheets

(56) References Cited

U.S. PATENT DOCUMENTS

| | | |
|---|---|---|
| 2004/0009785 A1* | 1/2004 | Nelson et al. ............... 455/522 |
| 2004/0097205 A1 | 5/2004 | Kim |
| 2005/0122938 A1 | 6/2005 | Kim et al. |
| 2006/0268792 A1* | 11/2006 | Belcea ........................ 370/338 |
| 2008/0310395 A1* | 12/2008 | Kashima .................... 370/350 |
| 2009/0028112 A1* | 1/2009 | Attar et al. ................. 370/332 |
| 2009/0046573 A1* | 2/2009 | Damnjanovic ............. 370/216 |
| 2009/0286471 A1* | 11/2009 | Ma et al. ...................... 455/10 |
| 2010/0027456 A1* | 2/2010 | Onggosanusi et al. ..... 370/312 |
| 2010/0113045 A1* | 5/2010 | Iwamura et al. ........... 455/450 |
| 2010/0166098 A1* | 7/2010 | Luz et al. ................... 375/267 |
| 2010/0195607 A1* | 8/2010 | Lee et al. ................... 370/329 |
| 2010/0246561 A1* | 9/2010 | Shin et al. .................. 370/345 |
| 2010/0272009 A1* | 10/2010 | Cheng et al. ............... 370/315 |
| 2011/0034175 A1* | 2/2011 | Fong et al. ................. 455/450 |
| 2011/0038302 A1* | 2/2011 | Papasakellariou et al. ... 370/315 |
| 2011/0149774 A1* | 6/2011 | Chen et al. ................. 370/252 |
| 2011/0199986 A1* | 8/2011 | Fong et al. ................. 370/329 |
| 2011/0223883 A1* | 9/2011 | Ishii et al. .................. 455/408 |
| 2012/0033646 A1* | 2/2012 | Luo et al. ................... 370/336 |
| 2012/0044928 A1* | 2/2012 | Bhattad et al. ............. 370/350 |
| 2012/0327804 A1* | 12/2012 | Park et al. .................. 370/252 |
| 2013/0039195 A1* | 2/2013 | Weng et al. ................ 370/252 |
| 2013/0051310 A1* | 2/2013 | Kim et al. .................. 370/315 |
| 2013/0194942 A1* | 8/2013 | Hu et al. .................... 370/252 |

* cited by examiner

METHOD AND APPARATUS FOR TRANSMITTING DATA IN A WIRELESS COMMUNICATION SYSTEM

This Application is a 35 U.S.C. §371 National Stage Entry of International Application No. PCT/KR2011/004381, filed Jun. 15, 2011 and claims the benefit of U.S. Provisional Application No. 61/354,708, filed Jun. 15, 2010, all of which are incorporated by reference in their entirety herein.

BACKGROUND OF THE INVENTION

1. Field of the Invention

The present invention relates to wireless communications and, in, particular, to a method and apparatus for transmitting data in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (gigabits per second) and uplink 500 Mbps (megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Typically, a terminal in the existing system is connected to one of base stations for both an uplink and a downlink. In other words, the terminal is connected to the base station to perform uplink transmission to the base station and downlink reception from the base station. However, in some cases, situations in which a channel state of one of the uplink and the downlink may be worse or loads may be increased can occur. Accordingly, in these cases, the uplink transmission and downlink transmission can be considered to be performed by different base stations or nodes.

When the uplink transmission and downlink transmission are performed by different base stations or nodes, there is a need to propose a method for the efficient operations of the base station and terminal.

SUMMARY OF THE INVENTION

The present invention provides a method and apparatus for transmitting data in a wireless communication system. The present invention provides the operations of the terminal and base station in a system in which the uplink transmission and downlink transmission are asymmetrically performed.

In an aspect, a method for transmitting data in a wireless communication system is provided. The method includes allocating a first node set containing a plurality of nodes for the transmission of downlink signals and a second node set containing a plurality of nodes for the reception of uplink signals, and communicating with a terminal through the first node set or the second node set.

The method may further include transmitting a first reference signal set and a second reference signal set that contain a plurality of reference signals for a plurality of node for determining the first node set and the second node set.

The plurality of reference signals may be channel state information (CSI) reference signal (RS).

The plurality of reference signals included in the first reference signal set may be reference signals for a plurality of nodes for measuring path-loss, and the plurality of reference signals included in the second reference signal set may be reference signals for a plurality of node for estimating channel states.

The plurality of reference signals included in the first reference signal set may be for a plurality of node for measuring downlink path-loss, and the plurality of reference signals included in the second reference signal set may be for a plurality of node for measuring uplink path-loss.

The first reference signal set and the second reference signal set may include representative reference signals of the reference signals allocated to the each node.

The method may further include receiving a feedback of a part or all of path-loss values for the plurality of nodes measured based on at least one of the first reference signal set and the second reference signal set from the terminal.

When the feedback of a part of path-loss values for the plurality of nodes is received, a feedback of N smallest path-loss values of the path-loss values may be received.

The method may further include receiving a feedback of the order of the plurality of nodes according to the size of path-loss values for the plurality of nodes measured based on at least one of the first reference signal set and the second reference signal set from the terminal.

In another aspect, an apparatus for transmitting data in a wireless communication system is provided. The apparatus includes a radio frequency (RF) unit to transmit or receive radio signals, and a processor connected to the RF unit, and configured for allocating a first node set containing a plurality of nodes for the transmission of downlink signals and a second node set containing a plurality of nodes for the reception of uplink signals, and communicating with a terminal through the first node set or the second node set.

When the uplink transmission and downlink transmission are performed by different base stations or nodes, the efficient operations of the base station and terminal can be controlled.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Figure 1:
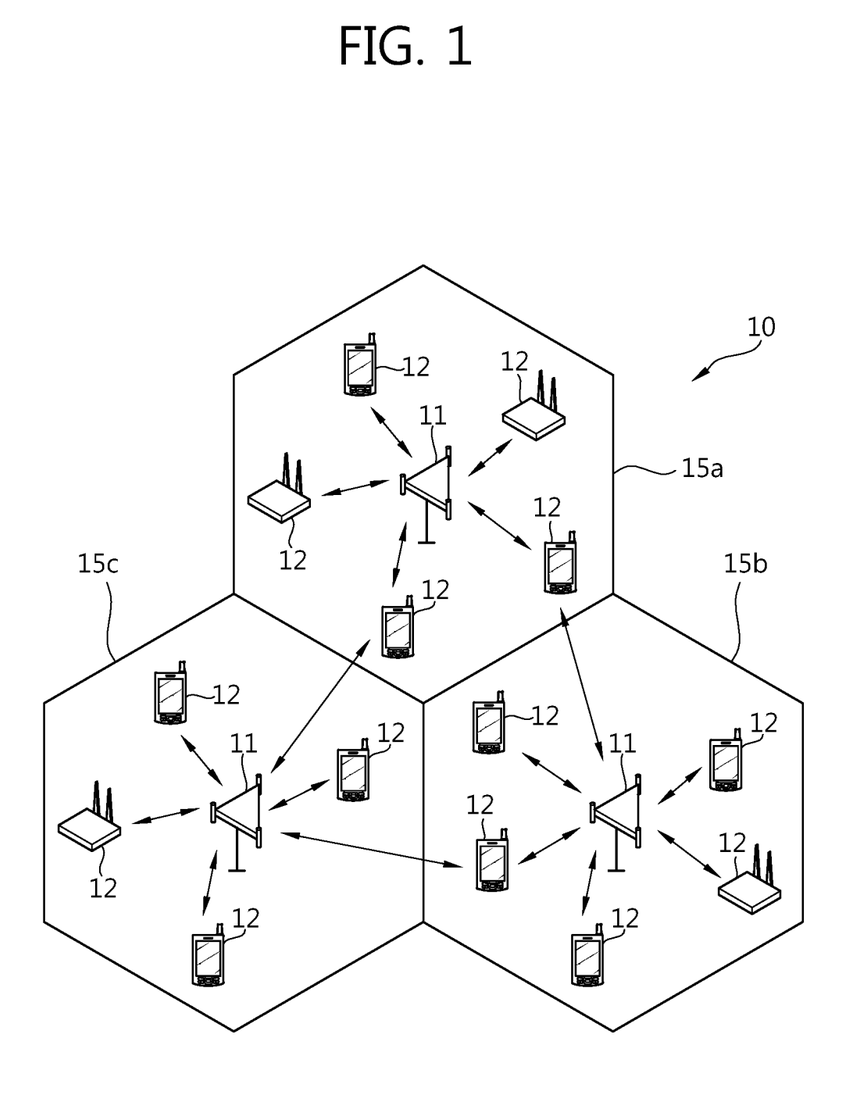
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
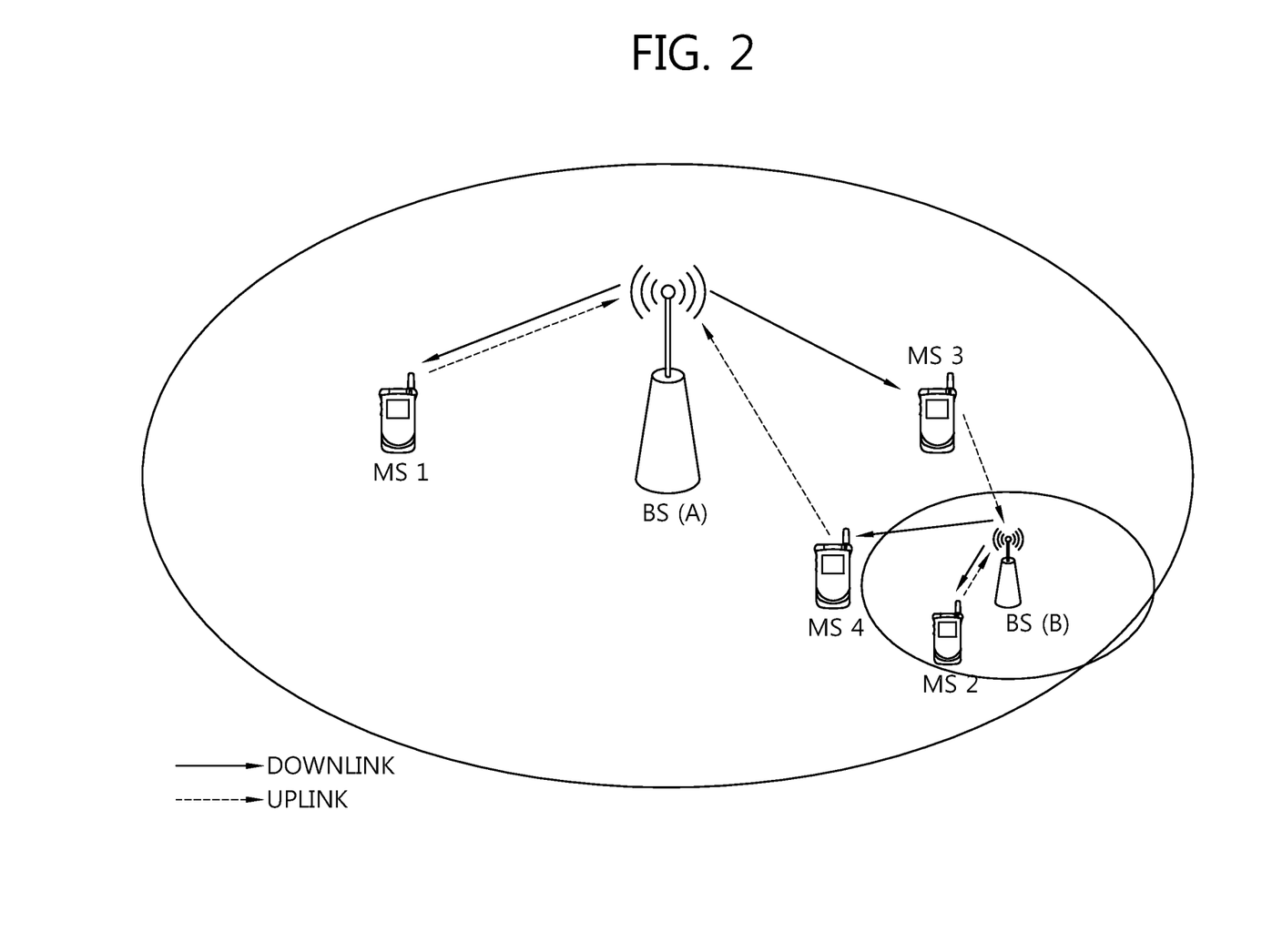
FIG. 2 shows another example of a wireless communication system.

FIG. 2 shows another example of a wireless communication system.

Referring to FIG. 2, a first terminal MS 1 is communicated with a base station A BS A. A second terminal MS 2 is communicated with a base station B BS B. A third terminal MS 3 receives a downlink from the base station A and transmits an uplink to the base station B. On the contrary, a fourth terminal transmits the uplink to the base station A and receives the downlink from the base station B. In other words, it may be considered that uplink transmission and downlink transmission are performed by different base stations. In FIG. 2, the base station may be one of a micro base station, a pico base station, a femto base station, or a relay station, as well as a common macro base station. In addition, although a case where the uplink and downlink are serviced by different base stations is illustrated in FIG. 2, the following description is not limited to the base station. That is, if there are a number of nodes, a DA that is an antenna node of a distributed antenna system (DAS), an antenna, or a radio remote header (RRH) within a cell, the terminal may be serviced from the number of nodes, the DA, the antenna, or the RRH. At this time, the uplink and downlink may be serviced by different nodes, DA, the antenna or the RRH. That is, a node that transmits the downlink to the terminal may be different from a node that receives the downlink from the terminal. Hereinafter, the base station, the node, the DA, the antenna and the RRH may be represented by being mixed with each other. In addition, in the present invention, it should be noted that they are equally applied, regardless of the base station, the node, the DA, the antenna and the RRH.

Meanwhile, although the coverage of the base station B is represented to be included in the coverage of the base station A in FIG. 2, the locations and the coverage of the base stations may be varied. For example, the base station B and the base station A may be neighbor base stations with the same coverage.

Hereinafter, a system of FIG. 2, that is, in a system in which the downlink transmission and uplink transmission are performed by different base stations, the operations of the terminal and base station will be described.

First, it will be described that the present invention is applied to two base stations with different frequency channel allocation schemes. In the frequency channel allocation scheme where only one of the uplink and downlink between two base stations is differently adaptive, the present invention may be applied. In addition, the present invention may be applied in the frequency channel allocation scheme where some intervals of the frequency domain between two base stations are equally adaptive, but the remaining intervals are differently adaptive. For example, the present invention may be applied in the frequency channel allocation scheme where the control domain is equally adaptive, but the data domain is differently adaptive.

In a case where a system of FIG. 2 is applied, a base station transmitting a downlink and a base station receiving an uplink are separated. Since it is assumed that the frequency channel allocation scheme (permutation) is differently adaptive between two base stations, cell IDs of the two base stations may be different from each other. All downlink channels including downlink control channels are transmitted from the base station A, and all uplink channels including uplink control channels are transmitted to the base station B. The base station A and base station B exchange the control information, transmission/reception data and the like through a backbone network. For example, when a downlink packet and allocation information regarding the downlink packet are transmitted from the base station A to a terminal, the base station A provides information regarding an uplink ACK/NACK (acknowledgement/non-acknowledgement) channel for the corresponding downlink packet to the base station B. The base station B receives the uplink ACK/NACK channel and provides the corresponding contents to the base station A. As another example, the base station A transmits the allocation information regarding the uplink packet to the terminal and also provides the same to the base station B. Accordingly, the base station B can receive the uplink packet from the terminal. The base station B receiving the uplink packet transmits the received packet and/or ACK/NACK information to the base station A. The base station A transmits the received ACK/NACK information to the terminal through the downlink ACK/NACK channel.

Figure 3:
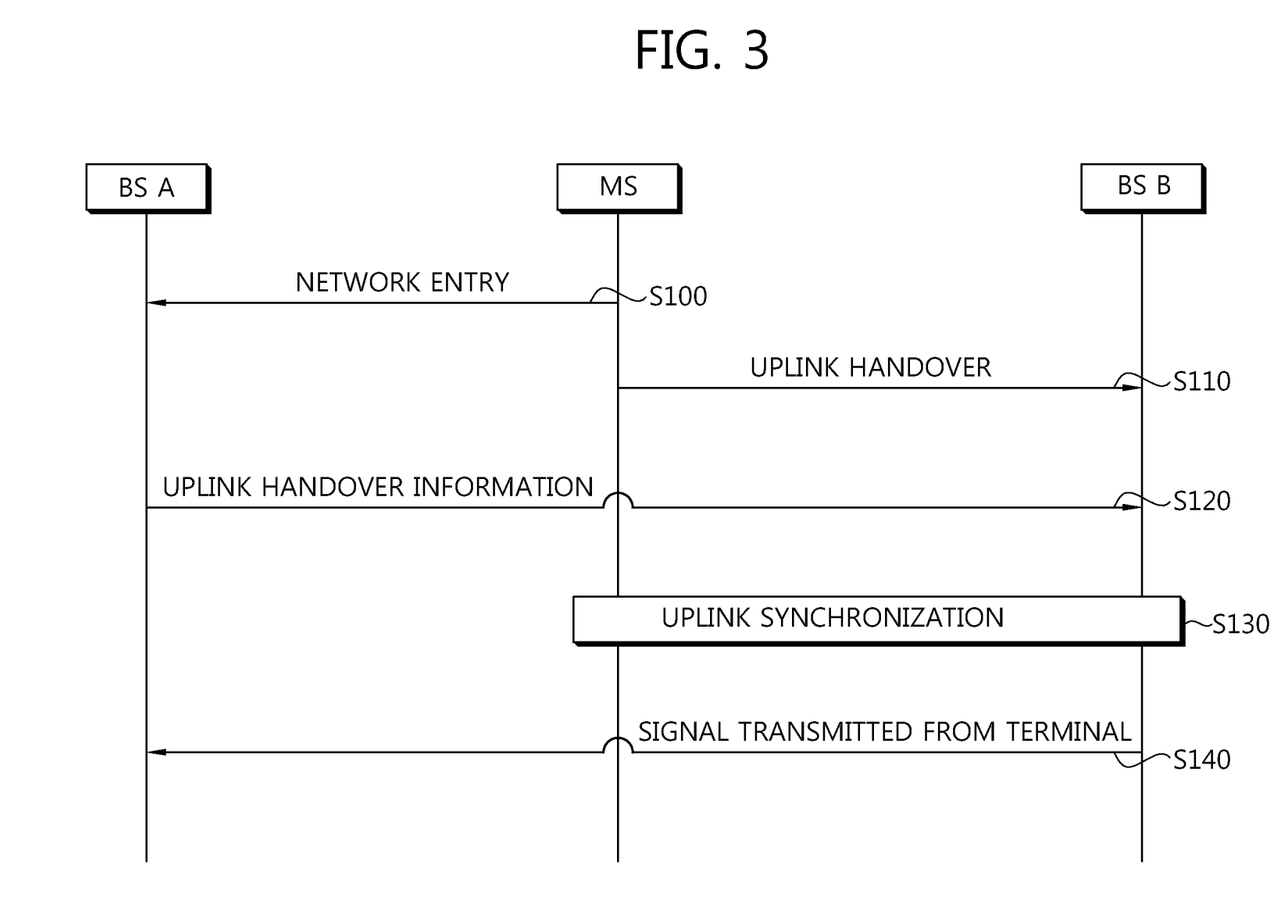
FIG. 3 shows an embodiment of a proposed data transmission method.

FIG. 3 shows an embodiment of a proposed data transmission method. FIG. 3 represents a case of handed over to the other base station for only uplink transmission, in a state where the terminal has performed the network entry to one base station.

Referring to FIG. 3, the terminal is in a network entry to the base station A at step S100 and hands over to the base station B at the uplink transmission at step S110 to the base station B. In other words, the terminal connects only the uplink to the base station B in the state where the downlink is connected with the base station A in succession. The uplink handover of the terminal may be performed according to the need of the base station or a request from the terminal.

The base station A transmits information necessary for the uplink handover for the base station B to the terminal at step S120. At this time, information regarding a cell ID of the base station B, an uplink permutation scheme, locations in the frequency domain or time domain of the control channel, the location and pattern of the reference signal, and the like to the terminal. In this case, the information may be unicast to the terminal. In addition, when a number of terminals perform the uplink handover for the base station B, the information may be multicast to the corresponding terminals. When the information is multicast, the terminals that receive the information have a multicast CID, respectively, and the multicast CID should be recognized by the base station and the terminal. For example, in the case of an IEEE 802.16m system, the information necessary for the uplink handover for the base station B may use the existing handover command message as it is, and at the same time, information regarding the type of handovers indicating a handover for the downlink, a handover for the uplink, or a handover for both the uplink and downlink may be additionally transmitted to the handover command message.

The terminal that receives information regarding the uplink handover for the base station B can adjust the uplink synchronization with the base station B using a ranging channel of the base station B at step S130. At this time, the ranging channel may use a contention-based ranging channel just as it is, or a dedicated ranging channel for the terminal that performs the uplink handover or a periodic ranging channel. The terminal can receive downlink signals from the base station A and transmit uplink signals to the base station B, after synchronizing with the base station B.

The base station B transmits signals transmitted from the terminal to the base station A at step S140. This is because that even if the terminal has performed the uplink handover to the base station B, the base station that still controls operations of the terminal may be the base station A. The signals transmitted from the terminal may be transmitted to the base station A through the backbone network. For example, when the base station B receives an uplink burst of the terminal, the success or failure regarding the reception of the uplink burst can be provided to the base station A. The base station A may transmit the ACK/NACK signal regarding the uplink burst to the terminal, and the terminal may determine whether they are re-transmitted or not, according to the ACK/NACK signal. In addition, if the terminal transmits the uplink bandwidth signal to the base station B such that the uplink bandwidth is allocated, the base station B transmits the uplink bandwidth signal to the base station A. Accordingly, the base station A can transmit the control channel regarding the uplink bandwidth allocation to the terminal.

The base station B, connected to the uplink with the terminal, needs to distinguish whether the base station B and the terminal are also connected to the downlink, or they are connected to only the uplink. Hereinafter, the case in which the base station B and the terminal are connected to the uplink and the downlink is represented as a $DU_{tog}$ state, and the case in which the base station B and the terminal are connected to only the uplink is represented as a $U_{only}$ state.

When the signal included with the ID (MS ID) of the terminal is transmitted, the $DU_{tog}$ state or the $U_{only}$ state may be distinguished by information such as the network entry or handover of the terminal. In addition, in case of the channel which is dedicated and allocated to the terminal, the $DU_{tog}$ state or the $U_{only}$ state may be distinguished, since the base station A and the base station B have the channel allocation information, respectively.

The signal that does not include the MS ID can be transmitted through a ranging channel or a bandwidth request channel (BRCH; bandwidth request channel), which are contention-based channels, or a hybrid automatic repeat request (HARQ) feedback channel (HFBCH; HARQ feedback channel) that performs an implicit mapping. The signal transmitted through the ranging channel, the BRCH or the HFBCH can be separated in the following methods.

1) Transmit a signal including the MSID, or allocate the channel uniquely to the terminal. For example, in a case of an IEEE 802.16m system, it is possible to transmit a BRCH signal that includes messages as well as BR preambles. In this case, the terminals in the $DU_{tog}$ state can transmit the BRCH signal including the preamble and the message so that the BRCH signal always including the MS ID may be transmitted. In addition, even if the $DU_{tog}$ state or the $U_{only}$ state is included, the terminal can always transmit the BRCH signal including the preamble and the message. The BR preamble is composed of 24 orthogonal codes of the code division multiple access (CDMA)-based length, and 18 bit information is included in 36 subcarriers through a tail-biting convolutional code (TBCC). The BR preamble and message may include information of 12 bit MS IDs, 4 bit BR sizes, quality of service (QoS) level and the like. If the base station receives only the BR preamble, only the orthogonal codes can be detected. In addition, if the base station receives the preamble together with the message, the information of the MS ID, the BR size, QoS level and the like can be detected.

The BRCH or BR header, or the ranging channel area may be periodically pre-allocated, or the orthogonal code may be pre-designated using a polling information element (IE). The orthogonal code may be uniquely designated for each of the terminals belonging to the $DU_{tog}$ state, or some codes may be designated so as to be used by all terminals belonging to the $DU_{tog}$ state.

2) Allocate the control channel separately for terminals belonged to the $U_{only}$ state. In other words, information regarding the control channel allocated separately may be broadcasted to the terminals, or unicast or multicast to the terminals belonged to the $U_{only}$ state. For example, in the IEEE 802.16m system, a dynamic ranging channel of the ranging channels may be allocated as the control channel for terminals belonged to the $U_{only}$ state. In the BRCH or feedback channel, a new area can be allocated through the AAI_SCD message and the like and the corresponding information can be broadcasted to the corresponding area.

Meanwhile, although the case in which the terminal performs an uplink handover to the base station B is described with reference to FIG. 3, the proposed data transmission method can be also applied in a case of the downlink handover. That is, the proposed data transmission method may be applied to the case in which the terminal performs the network entry to the base station A and the downlink connection is handed over to the base station B, or the terminal performs the network entry to the base station B and the uplink connection is handed over to the base station A. In this case, the terminal receives the preamble of the base station to adjust the synchronization after receiving information regarding the frequency allocation scheme, the cell ID for the base station A and the like from the base station B.

Hereinafter, in the case of the frequency channel allocation scheme where two base stations are equally adaptive, the proposed data transmission method applied to thereof will be described. If the frequency channel allocation schemes of two base stations are the same, the two base stations may be treated as one base station. That is, one base station may be considered to perform functions of a repeater of the other base station. Accordingly, the proposed data transmission method could be considered to be applied to a different node, DA, an antennas or RRH connected to one base station, rather than to be applied to the two base stations. That is, as shown in FIG. 3, the handover between two base stations is not applied. The following describes as representing a node, but the present invention can be applied without restriction of the DA, the antenna or RRH.

First of all, a frame structure of 3GPP LTE/LTE-A is described below.

Figure 4:
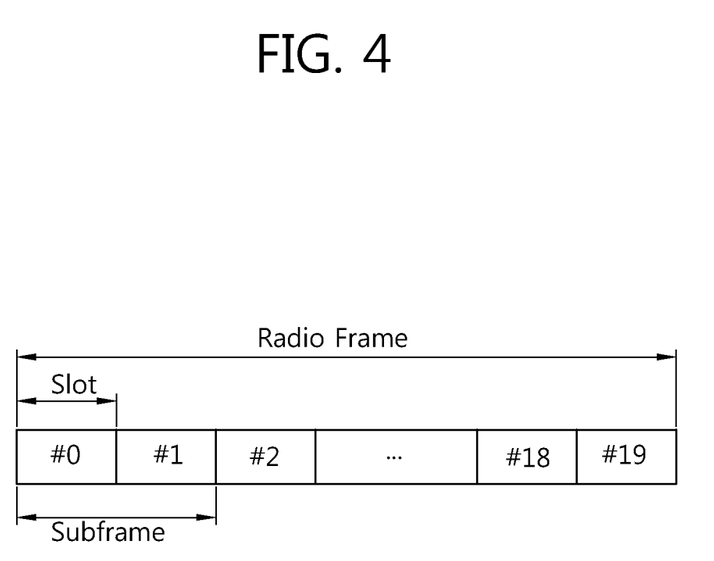
FIG. 4 shows the structure of a radio frame in 3GPP LTE.

FIG. 4 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 4, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 5:
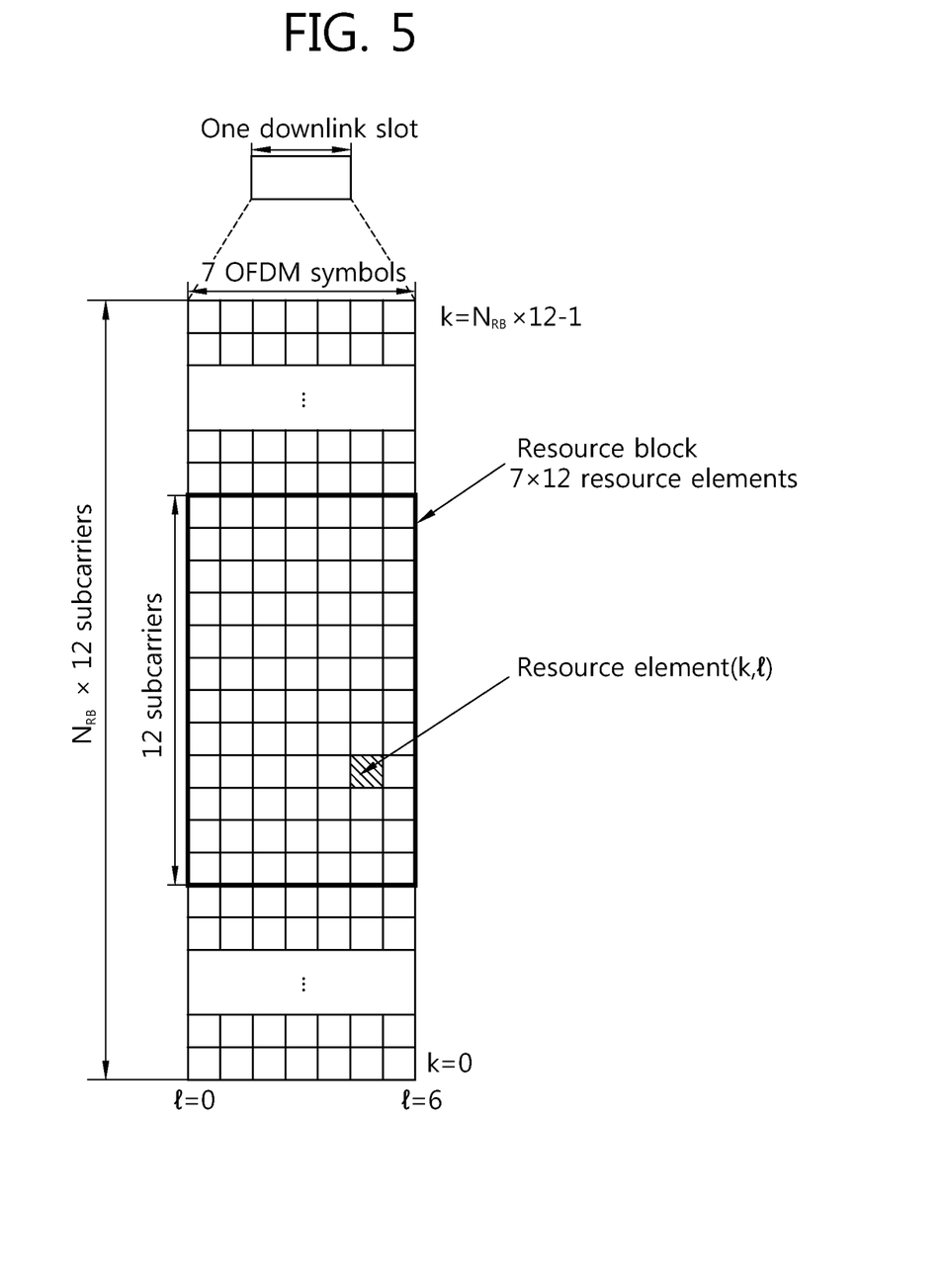
FIG. 5 shows an example of a resource grid of a single downlink slot.

FIG. 5 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12 - 1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

A reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

The downlink reference signals can be separated into a cell-specific reference signal (RS), a MBSFN reference signal, a terminal-specific reference signal (UE-specific RS), a positioning reference signal (PRS) and a channel state information (CSI) reference signal (CSI-RS). The CRS may be used either in data demodulation or channel estimation as a reference signal transmitted to all terminals within the cell. The CRS may be transmitted from all downlink subframes within the cell that support the PDSCH transmission. The MBSFN reference signal may be transmitted from subframes allocated to transmit the MBSFN, as a reference signal to provide a MBMS (Multimedia Broadcast Multicast Service). The MBSFN reference signal may be defined in only an extended CP structure. The terminal-specific reference signal may be referred to as a dedicated reference signal (DRS), that is, a reference signal received by a specific terminal or specific terminal group within the cell. In addition, the terminal-specific reference signal may be referred to a demodulation reference signal (DMRS) since it may be mainly used in a data demodulation of the specific terminal or specific terminal group. The PRS may be transmitted from resource blocks within the downlink subframe configured for transmission of the PRS, as a reference signal defined for location estimation of the terminal. The CSI-RS may be used for estimation of the channel state information in the 3GPP LTE-A system. The CSI-RS may be relatively sparsely disposed in the frequency domain or time domain, and may be punctured in the data region of a normal subframe or multimedia broadcast and multicast single frequency network (MBSFN) subframe. A channel quality indicator (CQI), a precoding matrix indicator (PMI), a rank indicator (RI) and the like may be reported from the terminal through the estimation of the CSI, if necessary. The CSI-RS can be transmitted through one, two, four or eight antenna ports.

Figure 6:
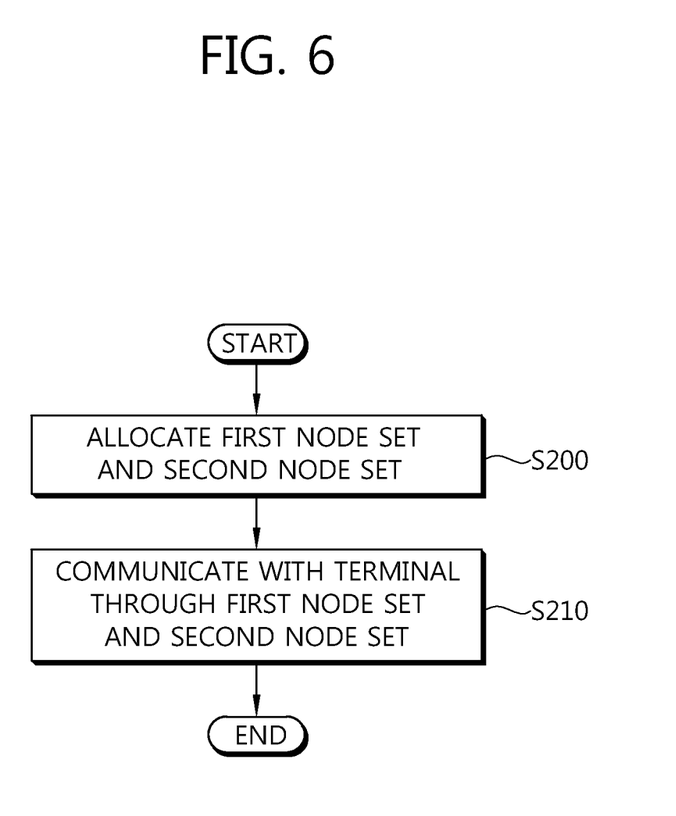
FIG. 6 shows an embodiment of the proposed data transmission method.

FIG. 6 shows an embodiment of the proposed data transmission method.

The base station allocates a first node set including a plurality of nodes for transmitting downlink signals and a second node set including a plurality of nodes for receiving uplink signals in step S200. The base station communicates with the terminal through the first node set or the second node set in step S210.

The plurality of nodes included in the first node set and the second node set is controlled by one base station. Accordingly, the base station can allocate the first node set for downlink transmission and the second node set for uplink reception, without the procedure of handover. At this time, the first node set for the downlink transmission and the second node set for the uplink reception may be allocated by path-loss values provided by the terminal. In other words, if the terminal calculates a downlink path-loss value and an uplink path-loss value for a plurality of nodes and provides the calculated values to the base station, the base station can allocate a first node set for downlink transmission and a second node set for uplink reception based on the path-loss value. The uplink path-loss value may be estimated from the downlink path-loss value. At this time, a plurality of nodes to measure the downlink path-loss value and a plurality of node to measure the uplink path-loss value may be inconsistent with the first node set and the second node set. That is, the first node set and the second node set may be determined based on the downlink path-loss value and the uplink path-loss value for a third node set different from the first node set and the second node set. In addition, if all the path-loss values for the plurality of node are measured and transmitted, signaling overhead may be increased. Accordingly, the base station can separate nodes for measuring the downlink path-loss value and nodes for measuring the uplink path-loss value. As a result, the terminal can measure any one of the downlink path-loss value or uplink path-loss value for each node and provide the measured value to the terminal. For example, the first node set and the second node set may be determined based on the downlink path-loss value for the third node set and the uplink path-loss value for fourth node set.

In order that the terminal measures the downlink path-loss value and the uplink path-loss value, the reference signal of each node may be used. At this time, since the location or pattern, etc., of the reference signal of each node may be different, there is a need in that the base station informs the terminal of the reference signal regarding information transmitted by each node. In this case, since the plurality of nodes has the same cell IDs, the path-loss value cannot be measured through the existing CRS. In addition, since the CRS supports up to four antennas, it may not be enough to measure the path-loss value for larger number of nodes. Accordingly, the base station can measure the downlink path-loss value and the uplink path-loss value using a CSI-RS in 3GPP LTE-A. At this time, the base station separates a plurality of CSI-RSs for a plurality of nodes into a CSI-RS for measuring the path-loss value and a CSI for measuring the CSI and provides information about this to the terminal. In addition, the CSI-RS for measuring the path-loss value can be separated into a CSI-RS for measuring the downlink path-loss value and a CSI-RS for measuring the uplink path-loss value. For example, the terminal measures the downlink path-loss value based on the CSI-RS for the third node set and the uplink path-loss value based on the CSI-RS for the fourth node set. The base station can determine the first node set and the second node set based on the downlink path-loss value and the uplink path-loss value provided from the terminal. When the plurality of CSI-RSs are allocated to each node, the CSI-RS based on measurement of the downlink path-loss value or the uplink path-loss value may be a representative CSI-RS of the plurality of CSI-RSs allocated to each node. For example, the representative CSI-RS may be a CSI-RS transmitted from a CSI-RS port with the smallest index of a plurality of CSI-RS ports of the each node, or a CSI-RS transmitted from a CSI-RS port used for data transmission of a first layer (layer 0). In addition, even if the plurality of nodes have the same cell IDs, the existing system measures the path-loss value using the CRS as it is, and the path-loss value can be measured using the CSI-RS for added new nodes to minimize the impact on the existing system. In addition, the existing system measures the path-loss value using the CRS as it is, and the path-loss value can be measured by the added new nodes using the CRS or CSI-RS based on another one cell ID.

Thus, if the reference signals are allocated to each of the plurality of nodes, the base station transmits the information regarding the reference signal allocated to the each node to the terminal, and the terminal measures the downlink path-loss value or the uplink path-loss value for the each node based on the information regarding the reference signal to transmit the measured results to the base station. At this time, the terminal can provide a part or all of the measured downlink path-loss value or uplink path-loss value to the base station. When the terminal provides a part or all of the measured downlink path-loss value or uplink path-loss value to the base station, the terminal can provide N smallest path-loss values of the measured path-loss values to the base station. In addition, the terminal can provide the order of the plurality of nodes to the base station according to the size of the measured path-loss values.

Figure 7:
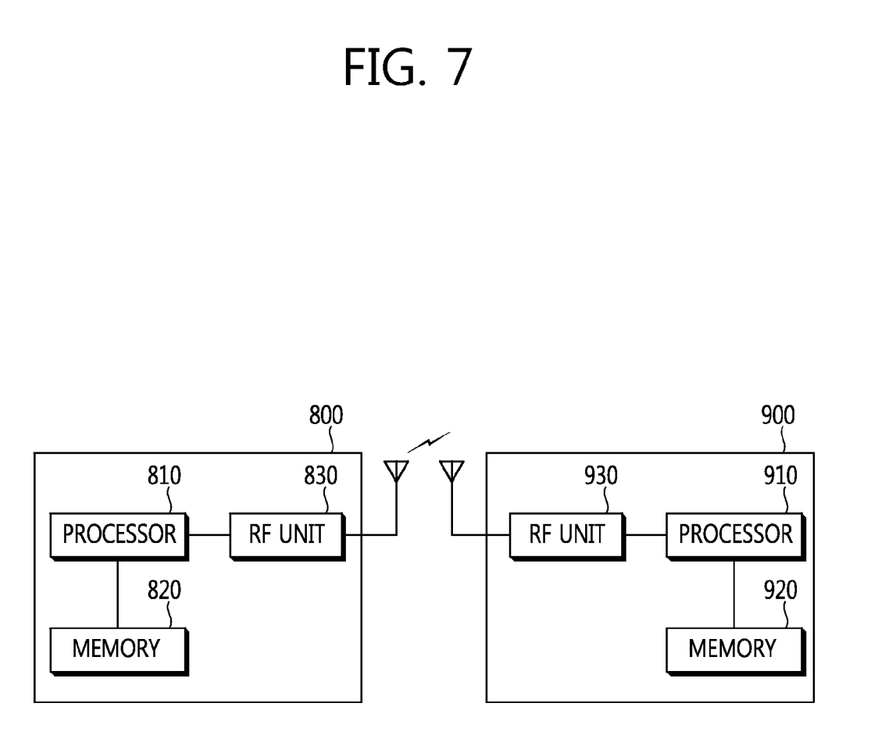
FIG. 7 is a block diagram showing wireless communication system to implement an embodiment of the present invention.

FIG. 7 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/ or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A terminal 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting data in a wireless communication system, the method comprising:
    transmitting a first reference signal set and a second reference signal set that contain a plurality of reference signals for a plurality of nodes for determining a first node set and a second node set,
    wherein the first node set comprises a plurality of nodes for a transmission of downlink signals and the second node set comprises a plurality of nodes for a reception of uplink signals;
    allocating the first node set and the second node set respectively,
    wherein the first node set and the second node set are separately allocated for the transmission of downlink signals and the reception of uplink signals,
    wherein the plurality of reference signals included in the first reference signal set are for a plurality of nodes for measuring downlink path-loss, and the plurality of reference signals included in the second reference signal set are for a plurality of nodes for measuring uplink path-loss;
    communicating with a terminal through the first node set or the second node set; and
    receiving a feedback of a part or all of path-loss values for the plurality of nodes measured based on at least one of the first reference signal set and the second reference signal set from the terminal,
    wherein, when the feedback of a part of path-loss values for the plurality of nodes is received, a feedback of N smallest path-loss values of the path-loss values is received, and
    wherein a receiving order of the feedback for the plurality of nodes is determined according to a size of path-loss values for the plurality of nodes measured based on at least one of the first reference signal set and the second reference signal set from the terminal.

2. The method according to claim 1, wherein the plurality of reference signals is channel state information (CSI) reference signal (RS).

3. The method according to claim 1, wherein the first reference signal set and the second reference signal set include representative reference signals of the reference signals allocated to the each node.

4. An apparatus for transmitting data in a wireless communication system, the apparatus comprising:
    a radio frequency (RF) unit to transmit or receive radio signals; and
    a processor connected to the RF unit, and configured for:
    transmitting a first reference signal set and a second reference signal set that contain a plurality of reference signals for a plurality of nodes for determining a first node set and a second node set,
    wherein the first node set comprises a plurality of nodes for a transmission of downlink signals and the second node set comprises a plurality of nodes for a reception of uplink signals;
    allocating the first node set and the second node set respectively,
    wherein the first node set and the second node set are separately allocated for the transmission of downlink signals and the reception of uplink signals,
    wherein the plurality of reference signals included in the first reference signal set are for a plurality of nodes for measuring downlink path-loss, and the plurality of reference signals included in the second reference signal set are for a plurality of nodes for measuring uplink path-loss;
    communicating with a terminal through the first node set or the second node set; and
    receiving a feedback of a part or all of path-loss values for the plurality of nodes measured based on at least one of the first reference signal set and the second reference signal set from the terminal,
    wherein, when the feedback of a part of path-loss values for the plurality of nodes is received, a feedback of N smallest path-loss values of the path-loss values is received, and wherein a receiving order of the feedback for the plurality of nodes is determined according to a size of path-loss values for the plurality of nodes measured based on at least one of the first reference signal set and the second reference signal set from the terminal.

5. The apparatus according to claim 4, wherein the plurality of reference signals is channel state information (CSI) reference signal (RS).

6. The apparatus according to claim 4, wherein the first reference signal set and the second reference signal set include representative reference signals of the reference signals allocated to the each node.

* * * * *